Aug. 3, 1965 W. J. ASHWORTH 3,199,005

REMOTE MOTOR CONTROL SWITCHING SYSTEM

Filed Nov. 6, 1962 2 Sheets-Sheet 1

INVENTOR:
WILLIAM J. ASHWORTH
BY
Rummler and Snow
ATT'YS

REMOTE MOTOR CONTROL SWITCHING SYSTEM

Filed Nov. 6, 1962 2 Sheets-Sheet 2

INVENTOR:
WILLIAM J. ASHWORTH
BY
[signature]
ATT'YS

United States Patent Office 3,199,005

Patented Aug. 3, 1965

3,199,005
REMOTE MOTOR CONTROL SWITCHING SYSTEM

William J. Ashworth, New Albany, Miss., assignor to Artnell Company, Chicago, Ill., a corporation of Delaware Filed Nov. 6, 1962, Ser. No. 235,769
16 Claims. (Cl. 318—16)

This invention relates to remotely controlled switching means and particularly to an improved remote control system and apparatus for the selective operation of a plurality of continuously adjustable switching elements; for example, the operation of a tuner and an on-off-volume-control means for adjusting the operating characteristics of a television receiver.

A particular object of this invention is to provide an improved remotely controlled switching system which is adjustably operable in response to wave energy emanating from a remote source; to provide such a control system which may be actuated by means of a controllable light source; and to provide a light beam actuated control system which is not affected by variations in the ambient light of the environment in which the control system is located.

Further objects of this invention are to provide an improved remotely-actuated control system for a wave signal receiver; to provide such a system which is operable by means of a light beam; to provide such a remotely controlled system in which the tuning and audio volume characteristics are adjusted by means of a controlled light beam; to provide such a system in which the operation of the tuning and volume control means is reversible.

Still further objects are to provide an improved remotely controlled switching system in which the direction of operation of rotary switching elements is controlled by varying the intensity of wave energy emanating from a remote source; to provide an improved remote control system for a wave signal receiver which permits manual operation of the receiver without disconnecting or otherwise interfering with the remote control actuation of the system; and to provide an improved reversible control system for operating the adjustable components of a wave signal receiver which may be easily added to or incorporated in conventional wave signal receivers without substantially modifying their basic construction.

A specific embodiment of this invention, as arranged for the remotely controlled operation of the tuner and volume control components of a wave signal receiver, is illustrated in the accompanying drawings in which.

The principal concept of this invention is to provide a pair of impedance elements, each capable of a substantial change in impedance value in response to a pulse of wave energy from a remote source, arranged in a bridge circuit so that each will control a respective uni-directional current path for the operation of a motor control relay; and to so arrange a plurality of relay means in each of the uni-directional current paths that the selective operation of the relays therein is determined by the extent of change in impedance value of the respective impedance means as determined by the intensity of the wave energy emanating from the remote source.

Figure 1:
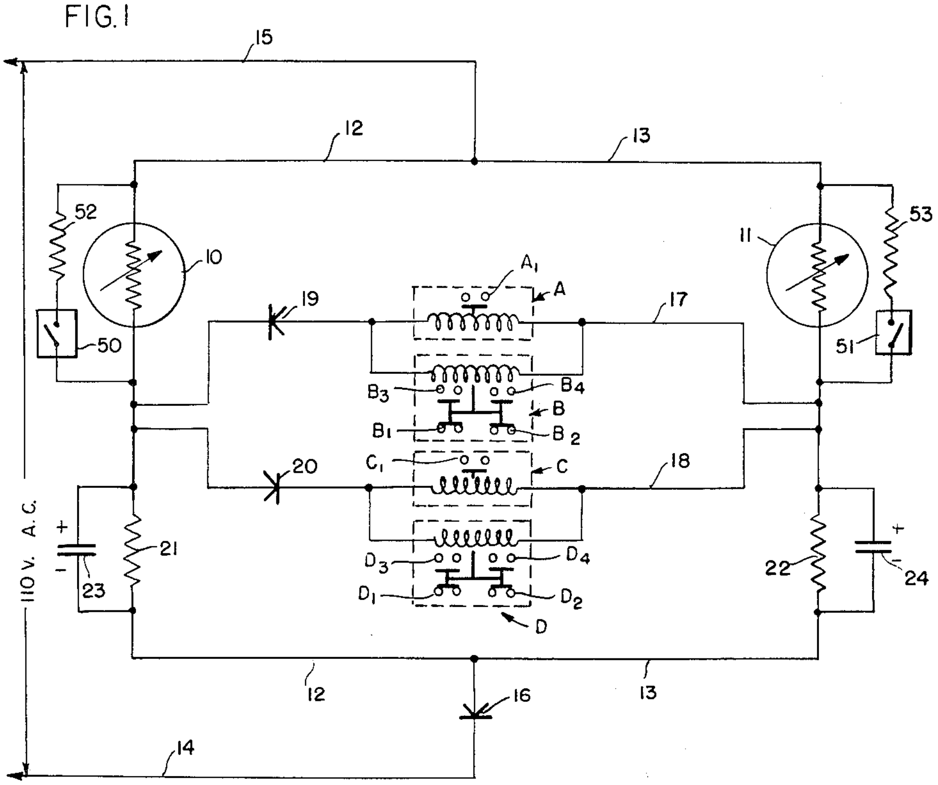
FIGURE 1 is a diagram showing an electric circuit for the selective operation of two independently operable wave signal receiver components by means of a directionally controlled remote source of light wave energy.

As illustrated in FIG. 1 of the drawings, the primary circuit for the remotely controlled operation of the tuner and volume regulating components of a wave signal receiver comprises a pair of impedance elements 10 and 11 connected in parallel, by leads 12 and 13, across the leads 14 and 15 of a conventional 110 volt alternating current supply line, the leads 12 and 13 branching from a common junction with a conventional rectifier 16.

On one side of the impedance means 10 and 11 the parallel leads 12 and 13 are bridged by lines 17 and 18 which are rendered uni-directional for current flow by respective rectifiers 19 and 20, and each of which lines includes a pair of relays connected in parallel. As shown, the bridge lead 17, which is rendered uni-directional for current flow only toward the impedance means 11, includes relays A and B; and the bridge lead 18, which is uni-directional for current flow only toward the impedance means 10, includes the parallel connected relays C and D. In this arrangement one of the parallel connected relays in each bridge lead is wound to operate on a lesser amount of current flow than the other relay. Thus, for example, with a relatively small decrease of the impedance of the impedance means 11 the relay A alone would operate, and upon a large decrease of the impedance of the means 11, both relays A and B would operate. This manner of operation would be the same for the bridge lead 18 in which amount of current flow would be controlled by the impedance of the means 10.

It will now be seen that, with the impedance of the elements 10 and 11 under like conditions being equal and the total resistance in each of the leads 12 and 13 being the same, the relay control leads 17 and 18 are in a balanced bridge circuit in which current flow can occur only when the impedance means are out of balance and then only through the impedance element having the lesser resistance to current flow.

As shown in FIG. 1, each of the leads 12 and 13 includes a voltage dropping resistor indicated at 21 and 22, and a parallel smoothing or filter condenser indicated at 23 and 24, each voltage dropping resistor 21–22 and the respective impedance element 10–11 comprising a voltage divider for reducing the voltage load to be carried by the primary circuit and the filter condenser 23–24 serving to smooth the pulsating direct current created by the rectifier 16.

The purpose of the primary circuit of FIG. 1 is to operate the relays of the two bridging lines 17 and 18 and, as shown, each bridging line includes a single-pole single-throw relay (indicated at A and C) and a double-pole double-throw relay (indicated at B and D) with the operating coils of the two relays connected in parallel; and in the system shown, the function of each pair of relays (A–B and C–D) is to control the reversible operation of a motor means for driving a switching element such as the tuner of a wave signal receiver. It will be understood, however, that where uni-directional operation of the motor means is desired only a single relay will be needed in the particular bridging circuit.

As shown in FIG. 1, each single-pole relay A and C has normally open contacts or switch means, $A_1$ and $C_1$ respectively, adapted to be actuated by its operating coil; and each double-pole double-throw relay B and D has a pair of normally closed switch means, $B_1$–$B_2$ and $D_1$–$D_2$ respectively, and a pair of normally open switch means, $B_3$–$B_4$ and $D_3$–$D_4$ respectively. Also the operating coil for each relay B and D is wound to require a greater amount of current for actuating the relay than the coil for the respective parallel relay, A and C. Thus, when there is a predetermined minimum current flow through one of the bridge lines or circuits, as determined by decrease of resistance through the corresponding impedance element, only the single-pole relay in that circuit will operate, but when a greater amount of current flow occurs in the said bridge circuit both relays will operate. It is in this manner that reversible operation of a switching element can be obtained as will be hereinafter explained.

Figure 2:
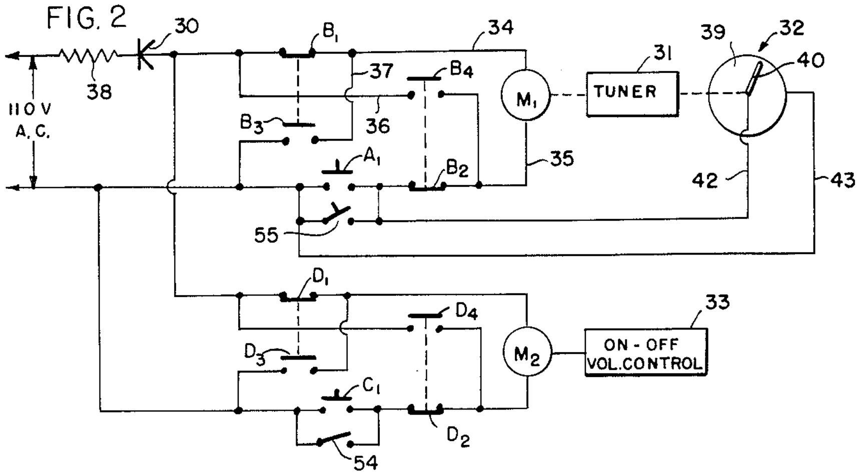
FIG. 2 is a diagram illustrating the reversible motor circuits which are controlled by the circuit of FIG. 1 to operate the motor means driving the tuner component and the on-off-volume control component of a wave signal receiver.

Typical motor operating circuits controlled by the relays A, B, C and D are shown in FIG. 2 wherein the connections of the motor means in the two bridge circuits with a common power source, through the several relay switch means, are indicated. As shown, the power source is the same alternating current supply line used for energizing the primary control circuit of FIG. 1 and the relay contacts or switch means of both bridge circuits are connected into the line behind a rectifier 30 so as to provide a D.C. current for operation of the reversible motor means. The tuner operating circuit is controlled by the relays A and B in the bridge circuit 17 and the circuit operates the motor $M_1$ which drives the tuner 31 and a sequence or station selecting switch 32. The "on-off" and volume control operating circuit is controlled by the relays C and D in the bridge circuit 18 and this circuit operates the motor $M_2$ which drives the combination switch and potentiometer 33 for turning the receiver "on" and "off" and regulating audio volume when the set is "on." In each case the respective relay switch means or contacts are designated by the same characters shown in FIG. 1.

Figure 3:
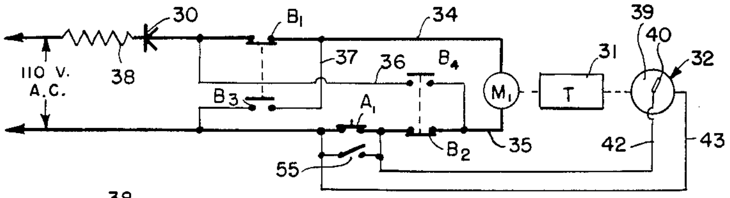
FIG. 3 is a detail showing the tuner-operating portion of the circuit of FIG. 2, as it is set up by the main control circuit of FIG. 1, for counter-clockwise or reverse operation of the tuner component of a receiver.
Figures 4, 5:
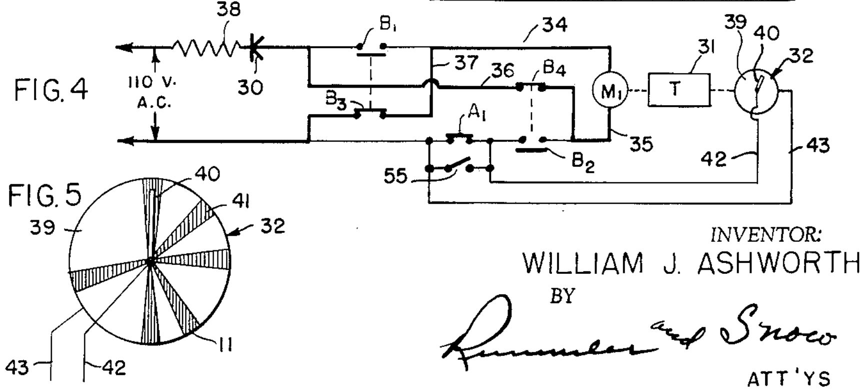
FIG. 4 is a similar view but showing the circuit of FIG. 3 as set up for clockwise operation of the tuner component.
FIG. 5 is a face view of a commutator type of sequence switch or station locator for automatically "tuning-in" a desired station.

The manner in which the relays in each component operating circuit perform their switching operations, for reversible operation of the respective motor, is demonstrated by FIGS. 3 and 4 wherein the tuner operating portion of the circuit of FIG. 2 is shown. FIG. 3 shows the circuit condition when only the relay A is actuated and the motor $M_1$ is energized for counter-clockwise rotation, i.e. reverse. FIG. 4 shows the circuit condition when both relays A and B are actuated and the motor $M_1$ is driving in the clockwise direction. It will be understood that the "on-off" and volume control portion of the circuit of FIG. 2 is identical in arrangement and operation with the tuner operating portion except only that the sequence device 32 is unnecessary and is therefore omitted.

Under the condition shown by FIG. 3 only the relay A has been actuated, as by a predetermined minimum current flow through the bridge circuit 17, and the single-pole switch $A_1$ is closed. The relay B remains inactive and in its normal condition wherein the switch elements $B_1$–$B_2$ are closed and the switch $B_3$–$B_4$ are open. The current flow to motor $M_1$ is now from rectifier 30, through normally closed switch $B_1$, to lead 34 and motor $M_1$ and thence by lead 35, through normally closed switch $B_2$, and actuated and closed switch $A_1$, to the opposite side of the power supply line. This current flow path is indicated in FIG. 3 by the heavy lead lines.

Under the conditions shown by FIG. 4, both relays A and B have been actuated, as by a greater current flow than the minimum needed to actuate relay A, and the normally closed switch elements $B_1$–$B_2$ are opened while the normally open switch elements $B_3$–$B_4$ are closed. Switch $A_1$, of course, is closed. Open switch elements $B_1$–$B_2$ break the normally closed direct connection to motor $M_1$ from the rectifier 30 and open the connection of lead 35 from the motor to the opposite side of the main supply line by way of switch $A_1$. Closing of the switch elements $B_3$–$B_4$ thus reverses the current flow through the motor $M_1$ from the rectifier 30, switch $B_4$ closing a direct by-pass lead 36, from the rectifier 30 to the motor lead 35, and switch $B_3$ closing a by-pass lead 37 which directly connects the motor lead 34 to the opposite side of the main supply line. This reverse current flow path is indicated by the heavy lines in FIG. 4.

Preferably, and in order to minimize the sizes of the relays A, B, C and D, and the motors $M_1$ and $M_2$, a voltage dropping resistor 38 is connected in the main supply line lead to the rectifier 30, whereby the voltage supplied to the operating circuits of FIG. 2 is reduced from 110 to 12 volts. Thus the switching components of the improved remote control system can be of a convenient size to be contained within a relatively small box which may be disposed wherever it will readily fit in a wave signal receiver chassis or cabinet.

The sequence switch 32, embodied in the tuner operating portion of the operating circuits of FIG. 2, may be any suitable device which, when set into operation, will automatically open the tuner motor driving circuit, or otherwise stop rotation of the tuner, when proper tuning of a station has been reached. In the form shown in FIGS. 2 and 5 the sequence device 32 is of the commutator type, as might be used with a continuous tuner of the kind employed for U.H.F. television signal reception, and comprises a body 39 of electrically conductive material against which a movable contactor or wiper arm 40 bears. The arm 40 is mounted fast on a shaft extension of the tuner 31 and thus its angular position about the shaft axis is in accordance with the angular position of the tuner mechanism. At angularly spaced locations on the face of the body 39, areas of insulation 41 are provided to correspond with the angular positions of the tuner when turned to the several stations which the receiver is intended to selectively receive. Also the wiper arm 40 is insulated from the body 39 except for the tip of the arm which bears against the body 39. Thus the arm 40 serves as a switching element which will make and break an electric connection between the arm and the body 39.

As shown in FIG. 2, the sequence switch or station selector 32 is connected in the tuner operating circuit, by leads 42 and 43, to by-pass the relay switch $A_1$. Thus the sequence switch 32 functions in the same way as relay switch $A_1$ and serves to close the driving circuit to the motor $M_1$, as shown in FIG. 3, when the switch $A_1$ is open and as long as the wiper arm 40 is contacting the body 39 between areas of insulation 41.

*Operation*

It will now be seen that the purpose of the primary control circuit as shown in FIG. 1 is to operate selectively one or more devices by means of a remotely directed beam of light wave energy. In a typical circuit of this kind the impedance devices 10 and 11 would be cadmium sulfide photo-cells having a sensitivity of 20 ma. and connected in parallel across a 110 volt A.C. line rectified by a 750 ma. rectifier 16. The voltage dropping means 21–22 in the photo-cell leads may each be a 2500 ohm 1 watt resistor to reduce the load on the photo-cells and the filter means 23–24 may be a two-section 30—30 mfd.-150 volt electrolytic condenser. Each of the rectifiers 19 and 20 may be 100 ma. devices; each of the relays A and C may be a 2500 ohm single-pole single-throw device set for actuation by 2.5 ma.; and each of the relays B and D may be a 2500 ohm double-pole double-throw device set for actuation by 5.0 ma. of current flow.

In such a circuit both sides or legs would normally be in balance—both cells 10 and 11 being subject to the same amount of light wave energy—and no current would flow through either of the bridging leads 17 and 18. However, a light beam directed on one or the other of the cells 10 and 11 will reduce the resistance of that cell and unbalance the system so that a current would flow through the bridging lead uni-directional to the affected cell. Thus, a greater amount of light directed onto cell 10 would cause a current flow through the bridging lead 18 and actuate one or both of the relays C and D. Likewise, a greater amount of light falling on cell 11, than on cell 10, would result in a current flow through bridging lead 17 and actuation of one or both relays A and B. As soon as both cells are equally illuminated, whether by natural or artificial ambient light, current flow through the bridging leads 17 and 18 ceases.

Thus, using a focusing flash-light as a controllable light source and directing the full light beam onto cell 10 would actuate both relays C and D to drive the "on-off" volume control motor $M_2$ in the forward direction to turn the receiver "on," the current flow being the same as shown in FIG. 4. The motor $M_2$ would continue to operate forwardly to adjust the volume switch as long as the full light beam was directed onto cell 10 and would stop when the light beam is removed. Then directing the full light beam onto cell 11 would actuate the relays A and B to drive the tuner motor $M_1$ in the forward direction, as shown in FIG. 4. In this case removal of the light beam from the cell 11 would stop the motor $M_1$ only if the station selector switch arm 40 were on an insulated area 41 (see FIG. 5). Otherwise the switch arm 40 would close the circuit, through the leads 42–43, bridging the relay switch $A_1$ and the motor $M_1$ would continue to run, but in the reverse direction, until the circuit around switch $A_1$ became opened by the selector arm 40 reaching the next adjacent insulated area 41. The tuner circuit condition when under the control of the selector 32 will be as shown in FIG. 3.

The motors $M_1$ and $M_2$ are coupled to the respective driven devices through suitable reduction gearing, not shown, so that operation of the driven devices will be sufficiently slow to permit accurate control. In a typical system 12 volt D.C. motors would be used and the voltage dropping means 38 would be a 300 ohm, 20 watt resistor.

As before indicated, the selective actuation of the relays in each of the bridging leads 17 and 18 is determined by the amount of current passing through the respective lead and it will be understood that the amount of current flow is wholly dependent upon the extent of unbalance produced between the two legs of the control system through decrease of the impedance of one cell as compared to the other cell due to more light reaching the one cell than the other. Therefore, since relays A and C operate on half the current needed to operate relays B and D, a relatively small difference in the illumination of one photo cell over the other will actuate the relays A and C while a large difference of illumination will be needed for actuation of relays B and D.

In the normal use of a directed light source, such as a focusing beam flash-light, the natural tendency is to center the beam on whatever object it is directed toward. Thus, in the operation of the control system as herein described, the light source would most naturally first be centered on the cell desired to be affected thereby creating a large difference in the amount of illumination of the one cell, as compared to that of the other cell, and causing actuation of the two relays in the unidirectional bridging circuit wherein the current flow is toward the one cell only. For example, if the light beam is centered on cell 11, a relatively large current flow will occur in bridging lead 17, sufficient to actuate relay B as well as relay A. Relay B opens the circuit through the switch $A_1$ of relay A, as shown at $B_2$ in FIG. 4, and sets up the operating circuit for tuner motor $M_1$ to drive it in the forward direction.

However, if reverse operation of motor $M_1$ is desired, it is necessary to render relay B inoperative and to actuate relay A alone so that the circuit condition of FIG. 3 will be obtained. This is accomplished by merely shifting the center of the control light beam so that it is off the cell 11 and so that only the relatively dim halo, surrounding the center spot of light, will fall upon the cell 11. In this manner the tuner operating system is under complete remote control and the tuner can be continuously operated, in either direction, at the will of the user. Reversible operation of the "on-off" and volume switch 33 by the motor $M_2$ is had in the same manner as in the case of the tuner by varying the amount of light directed onto the photo cell 10.

It will now be seen that with my improved remote control system only the primary control system of FIG. 1 need be continuously "hot," that is connected to the power source, and the receiver or other remotely controlled apparatus is connected to the power source only when needed. The current flowing through the parallel legs 12 and 13 of the primary control circuit will be determined by the amount of ambient light falling on the photo cells 10 and 11 and, though normally small in amount, will be proportional to the intensity of the ambient light. In the event that the cells 10 and 11 were to be exposed to bright sunlight, the current flow through the cells might be sufficient to cause them to overheat. This would be an abnormal condition under which a television receiver, for example, would not be usable. However, if protection against such a condition were needed a thermostatic switch means, not shown, sensitive to the temperature of each photo cell may be employed to disable the primary circuit until the cells cool.

*Manual operation*

Particularly in the case of wave signal receivers, such as a television receiver, subject to operation by a remote-control switching system, it is desirable to provide for manual operation of the receiver in the event of disabiilty of the remote control system. Also, in a wave signal receiver, it is desirable to provide a manual control means which is capable of both forward and reverse operation of the tuner and the volume control components. Therefore, in the primary control circuit of FIG. 1 there is provided a manually operated switch 50 for by-passing the photo cell 10 and a switch 51 for by-passing the photo cell 11, the switch 50 controlling operation of the "on-off" and volume control swich through the relays C and D, and the switch 51 controlling the operation of the tuner through the relays A and B.

As shown, each of the switches 50 and 51 is connected in series with a suitable resistor, 52 and 53 respectively, which like the respective photo cell, provides a lower impedance path for the bridge circuit uni-directional to that cell sufficient to unbalance the system so as to actuate both relays in the said bridge circuit, as though a strong light (above the ambient light value) were directed onto the particular photo cell. Thus in the typical circuit before-mentioned, each of the resistors 52 and 53 would be a 300 ohm, 2 watt element. Because each switch 50 and 51 by-passes its respective photo cell 10 and 11, and the effect is that of a strong light being focused on the by-passed photo cell, the respective bridge circuit will be actuated so as to drive the controlled motor, $M_1$ or $M_2$ in the forward direction in accordance with the motor circuit shown in FIG. 4.

For manual operation of the control system, to drive the respective motors in the reverse direction, each motor control section of the operating circuit shown in FIG. 2 is provided with a manual switch, 55 and 54 respectively, by-passing the respective relay switch elements $A_1$ and $C_1$. Thus since the relay A and the relay C function to operate the respective motors $M_1$ and $M_2$ in the reverse direction, the manual closing of the switches 54 and 55 will perform the same function and cause the respective motors $M_1$ and $M_2$ to operate in the reverse direction.

Figure 8:
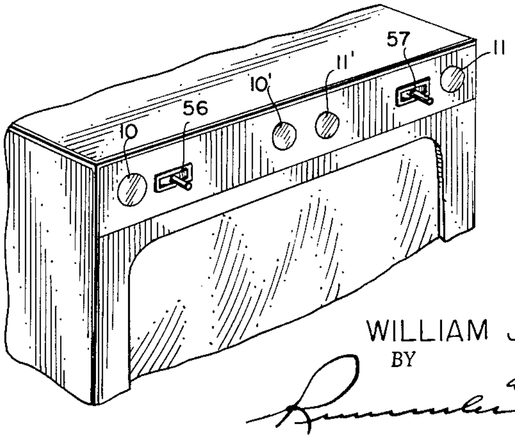
FIG. 8 is a view illustrating the manner in which the improved remote control system may be incorporated in the front panel of a wave signal receiver.

As a matter of convenience, I prefer that the manual switches 50 and 54 be combined in a single-pole double throw or switch unit as indicated at 56 in FIG. 8, and that the manual switches 51 and 55 be likewise combined in a dual switch unit as indicated at 57 in FIG. 8. Thus the dual switch 56 would be located adjacent the photo cell 10 for operation of the "on-off" and volume control means, and the dual switch 57 would be located adjacent the photo cell 11 for manual operation of the tuner. In this manner each direction in which the switches 56 and 57 are operated, can correspond with the direction of rotation of the motor which the respective switch controls.

*Shadow control*

In order to assure against inadvertent operation of the primary control circuit of FIG. 1, under high light-level conditions, through unbalance of the system caused by a shadow falling on one of the photo cells and not on the other, two photo cells may be connected in parallel in each leg 12 and 13 of the balanced bridge circuit. One photo cell of one leg is then positioned in side-by-side relation with one of the photo cells of the other leg and the remaining photo cells are spaced apart as far as possibe. Such an arrangement is shown in FIG. 6 of the drawings which illustrates the manner in which parallel photo cells are connected into each leg 12 and 13 of the primary circuit of FIG. 1.

As shown, photo cells 10 and 10' are connected in parallel in leg 12 of the balanced bridge circuit, and photo cells 11 and 11' are connected in parallel in leg 13 of the balanced bridge circuit. Photo cells 10' and 11' are arranged side-by-side and photo cells 10 and 11 are spaced laterally as far as possible. This arrangement is also illustrated in FIG. 8, wherein the photo cells 10 and 11 are at the left and right hand sides respectively, of the wave signal receiver, and the photo cells 10' and 11' are arranged side-by-side adjacent the vertical centerline of the receiver.

In the before-mentioned typical circuit, the relays A and C would trip or actuate on a potential unbalance, between the bridge circuit legs 12 and 13, of approximately 2 volts. This is substantially the extent of unbalance between the bridge circuit legs 12 and 13 that would be caused by a relatively small amount of light, above the ambient light value, being directed upon one or the other of the controlling photo cells 10 and 11. Obviously, a shadow falling on one of the photo cells 10 and 11, while the other is illuminated by the ambient light, would normally result in a relatively lower resistance in the said other cell and a current flow toward that cell in the respective leg of the balance bridge circuit.

Figure 6:
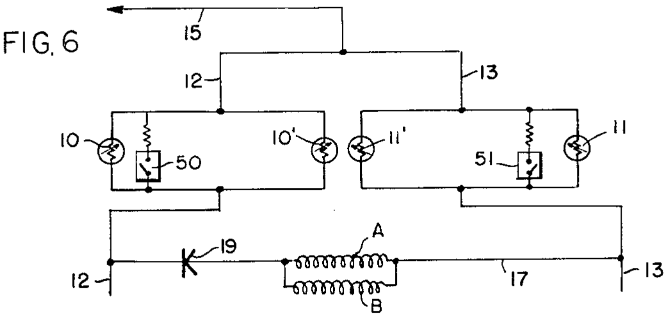
FIG. 6 is a schematic illustration of an arrangement for preventing inadvertent operation of the control system due to shadows falling on one or the other of light sensitive control elements employed in the circuit of FIG. 1.

In the arrangement of FIG. 6, however, and because of the ambient light falling on the respective parallel cell, 10' or 11', the voltage unbalance between the bridge circuit legs 12 and 13 would not be enough to actuate the minimum power relays A or C. This effect would be the same whether the shadow fell on one of the outer photo cells 10 or 11 alone, or on both the inner photo cells 10'–11'.

Figure 7:
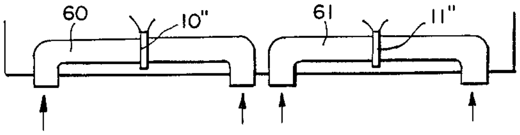
FIG. 7 is a schematic illustration of a modification of the system shown in FIG. 6 for obviating inadvertent operation due to shadows.

Another method by which the effect of shadows falling on one or the other of the controlling photo cells can be obviated, is shown diagrammatically in FIG. 7 of the drawings wherein "two-way" photo cells 10'' and 11'' are each arranged in the base portion of a respective U-shaped light transmission means 60 and 61, the ends of the legs of the U-shaped members providing the windows for light entry as indicated by the arrows in FIG. 7. These light transmission devices 60 and 61 may be of a plastic material, such as Lucite, or may be in the form of a double-ended periscope whereby light entering each leg is directed to the centrally disposed photo cell 10'' or 11''. These devices then may be mounted in a wave signal receiver cabinet in such a manner that the light entry ends or windows of the U-shaped elements 60 and 61 would be disposed as indicated at 10, 10' and 11–11' in FIG. 8.

In this arrangement the photo cells 10'' and 11'' are constructed so as to be influenced by light falling upon either of the opposite faces, such photo cells being made by depositing a calcium sulphide coating on a transparent support and enclosing the coated support in a glass case.

*Conclusion*

It will now be seen that by my improved, remotely controlled switching system I have provided a light beam operated balanced bridge circuit which is not affected by variation of the ambient light, in the environment where the control system is used, and yet is capable of the selective operation of a plurality of independent functions by the controlled application of additional light onto one side of the bridge circuit.

Other advantages of this invention reside in the simplicity of the control system, in so far as its components are concerned, and in the fact that the system is capable of continuous and reversible operation of the device which it controls. This fact renders the improved system particularly suitable for the operation of the tuner in a U.H.F. television receiver.

Although but one specific embodiment of this invention is herein shown and described, it will be understood that details of the system herein disclosed may be altered or omitted without departing from the spirit of the invention as defined by the following claims.

I claim:

1. A wave energy actuated remote control system comprising (a) a pair of wave energy responsive impedance means connected in parallel in a balanced bridge circuit having connection with a source of uni-directional electrical energy, (b) said bridge circuit having a bridge line including means permitting current flow therethrough toward one only of said impedance means and including the operating coil of a relay, (c) said impedance means being normally exposed to the same ambient wave energy and being of the kind wherein the resistance to current flow therethrough is determined by the amount of wave energy applied to said impedance means, and (d) the relay coil in said bridge line being energized by a current flow therein only when a different amount of wave energy is applied to said one impedance means than to the other.

2. A remote control system as defined in claim 1 wherein the impedance means are photo sensitive devices responsive to light-wave energy.

3. A remote control system as defined in claim 1 wherein the bridge line includes parallel relay operating coils one of which coils is wound to actuate its relay on a lesser amount of current flow than the other coil.

4. A remote control system as defined in claim 1 wherein the balanced bridge circuit includes a pair of bridge lines, each including means permitting current flow therein toward a respective one only of the impedance means, and wherein each bridge line includes the operating coil of a respective relay.

5. A remote control system as defined in claim 4 wherein each bridge line includes a pair of parallel relay operating coils, and one coil of each pair is wound to actuate its relay on a lesser amount of current flow than the other coil of said pair.

6. A remote control system responsive to wave energy emanating from a controllable remote source comprising (a) a normally balanced bridge circuit having parallel legs connected between the leads of a source of unidirectional current, (b) each of said legs including wave energy responsive impedance means of the kind wherein resistance to current flow therethrough is determined by the amount of wave energy affecting said impedance means, said impedance means being disposed to be affected by ambient wave energy common to both, (c) a bridge line connected between said legs and including the operating coil of a relay and rectifying means permitting flow of current therethrough only in the direction toward the impedance means in one of said legs, and (d) relay switch means actuated by said operating coil for closing and opening an independent electric circuit in response to flow of current in said bridge line when the impedance means in the said one leg is subjected to wave energy from said remote source.

7. A remote control system as defined by claim 6 wherein each leg of the balanced bridge circuit includes a pair of impedance means, each pair being connected in parallel in the respective leg, an impedance means of one pair being disposed adjacent an impedance means of the other pair and the remaining impedance means being spaced apart in respectively opposite directions from the adjacent ones, all of said impedance means normally being subjected to a common ambient wave energy condition.

8. A remote control system as defined by claim 6 wherein the said bridge line includes the operating coils for the switch means of first and second relays, said coils being connected in parallel and one coil being wound and connected to actuate the switch means of the first relay on a lesser current flow than required by the other coil for actuating the switch means of the second relay, each of said relays controlling a different electric circuit, and the switch means of the second relay being connected to open the circuit controlled by the first relay whenever the second relay is actuated.

9. A remote control system as defined by claim 6 wherein the impedance means included in each leg of the balanced bridge circuit comprises two independent wave-energy-sensitive areas disposed so that each sensitive area can be affected by wave energy independently of the other.

10. A remote control system as defined by claim 6 wherein the impedance means in each leg of the said bridge circuit is provided with two spaced wave energy receiving and conducting means, and each of said receiving and conducting means is disposed to transmit wave energy to the respective impedance means independently of the other receiving and conducting means.

11. A remote control system responsive to light wave energy from a controllable remote source comprising (a) a normally balanced bridge circuit having parallel legs connected between the leads of a source of unidirectional current, (b) each of said legs including photo-sensitive impedance means of the kind wherein resistance to current flow therethrough is inversely affected by the amount of light wave energy affecting said impedance means, said impedance means being disposed within the influence of ambient light common to both, (c) a bridge line connected between said legs and including the operating coil of a relay and rectifying means for permitting current flow only in one direction through said line and toward one of said impedance means, and (d) switch means actuated by said operating coil for closing and opening an independent electric circuit in response to current flow in said bridge line upon lowering of the resistance in said one impedance means by light wave energy emanating from said remote source.

12. A remote control system according to claim 11 for controlling the operation of an adjustable component of a wave signal receiver and wherein the said independent electric circuit energizes a motor, said control system causing operation of the motor whenever the bridge circuit is unbalanced to permit current flow in said bridge line and coil sufficient to operate said switch means.

13. A remote control system according to claim 11 for selectively operating a reversibly adjustable component of a wave signal receiver and wherein the said component is driven by a reversible electric motor, and wherein the bridge line includes the operating coils for the switch means of first and second relays, said coils being connected in parallel and one coil being adapted to actuate the switch means of the first relay on a lesser current flow than required by the other coil to actuate the switch means of the second relay, each of said relays controlling a different circuit to said electric motor, and the second relay having normally closed switch contacts operable to open the motor circuit of the first relay whenever the said switch means of the second relay is actuated.

14. A remote control system responsive to light wave energy for selectively operating two reversibly adjustable components of a wave signal receiver, each of said components being driven by a reversible electric motor, said system comprising (a) a normally balanced bridge circuit having parallel legs connected between the leads of a source of unidirectional current (b) each of said legs including photo-sensitive impedance means disposed within the influence of the same ambient light and of the kind wherein resistance to current flow therethrough varies inversely as the intensity of the light wave energy impinged thereon, (c) two bridge lines connecting the said parallel legs on the minus side of said impedance means and each bridge line including (1) rectifying means for limiting current flow therein to a direction opposite that of the other bridge line and (2) a pair of relay switch actuating coils connected in parallel for controlling one of said motors, (d) one of the coils in each bridge line being wound to actuate a relay switch on a lesser current flow than is required by the other coil of that line for actuation of its relay switch, and (e) each of the relay switches operated by a respective bridge line being connected to control a different one of two electric circuits for a reversible motor.

15. A remote control system according to claim 14 wherein each leg of the bridge circuit includes a pair of photo-sensitive impedance devices of the kind wherein resistance to current flow therethrough varies inversely of the intensity of the light impinged thereon, which devices are connected in parallel with each other in the respective leg and are spaced apart laterally so as to be individually influenced by light wave energy directed from said remote source while being simultaneously influenced by the ambient light.

16. A remote control system according to claim 14 wherein the photo-sensitive impedance means in each leg of the said bridge circuit is subject to the simultaneous influence of ambient light wave energy received at two spaced energy receiving areas.

References Cited by the Examiner

UNITED STATES PATENTS

| | | | |
|---|---|---|---|
| 1,877,279 | 9/32 | Dawson | 250—209 |
| 2,041,079 | 5/36 | Lyle | 318—16 X |
| 2,240,800 | 5/41 | Rigert | 250—209 X |
| 2,295,894 | 9/42 | Dewan | 319—137 X |
| 2,446,046 | 7/48 | Harley | 250—210 X |
| 2,597,424 | 5/52 | Znaidukas | 318—16 X |
| 2,671,877 | 3/54 | Stewart | 318—29 |
| 2,773,219 | 12/56 | Aron | 250—210 X |
| 2,946,931 | 7/60 | Durbin | 250—210 X |
| 2,971,142 | 2/61 | Montross | 318—29 |
| 3,072,795 | 1/63 | Bodmaieff | 250—210 X |
| 3,098,212 | 7/63 | Creamer | 318—16 X |

ORIS L. RADER, *Primary Examiner.*